United States Patent Office 3,424,771
Patented Jan. 28, 1969

3,424,771
NOVEL AMIDO DERIVATIVES USEFUL AS AIDS IN DETERGENT COMPOSITIONS
Louis H. Libby and Minnie G. Libby, Wilson, N.C., assignors to Lumin Chemical Company, Wilson, N.C., a corporation of Illinois
No Drawing. Continuation of application Ser. No. 308,694, Sept. 13, 1963. This application July 11, 1967, Ser. No. 652,627
U.S. Cl. 260—404.5     7 Claims
Int. Cl. A61k 7/08; C11d 3/00

This application is a continuation of application Ser. No. 308,694, filed Sept. 13, 1963, now abandoned.

The present invention is directed to novel amido compounds and more particularly to amido derivatives of fatty acids.

It is an object of this invention to provide novel amido derivatives. It is also an object of this invention to provide novel polyamido compounds. It is a further object of this invention to provide processes for preparing said novel compounds. This invention also contemplates providing compositions containing synthetic detergents which are substantially non-irritating due to the incorporation therewith of one of said novel compounds.

We discovered novel compounds having the formula

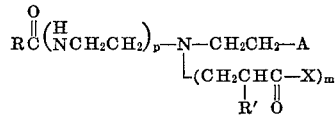

wherein $p$ is 0–1; $m$ is 0–1; when $p$ is 0, $m$ is also 0; R is a saturated or unsaturated hydrocarbon having from 8 to 20 carbon atoms and is preferably the residue of a fatty acid; X is the group $-NH_2$ or $-OR''$; $R''$ is an alkyl having 1 to 4 carbon atoms; $R'$ is hydrogen or an alkyl having 1 to 4 carbon atoms; and A is a group selected from

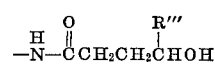

and

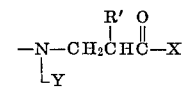

wherein Y is hydrogen or the group

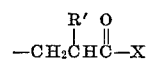

and $R'''$ is hydrogen or an alkyl having 1 to 4 carbon atoms.

Illustrative of the sub-genera within the above described genus are the following

| | | Example |
|---|---|---|
| A | $RCONHCH_2CH_2NHCOCH_2CH_2CH_2OH$ | 2 |
| B | $RCONHCH_2CH_2NHCH_2CH(CH_3)CONH_2$ | 3 |
| C | $RCONHCH_2CH_2N(CH_2CH_2CONH_2)_2$ | 4 |
| D | $RCONHCH_2CH_2N(CH_2CH_2CONH_2)(CH_2CH_2OH)$ | 6 |
| E | $RCONHCH_2CH_2N(CH_2CH_2CONH_2)(CH_2CH_2OCH_2CH_2CONH_2)$ | 7 |
| F | $[RCONHCH_2CH_2N(CH_2CH_2CONH_2)(CH_2CH_2OCH_2CH_2CONH_2)(CH_2CH_2CONH_2)]^+ OH^-$ | 8 |

| | | Example |
|---|---|---|
| G | $\underset{\parallel}{O}\underset{H}{\parallel}$ RCNCH₂CH₂NCH₂CH₂NCCH₂CH₂CH₂OH $\underset{\parallel}{H}\underset{O}{\parallel}$ | |
| H | O H ⎡CH₂CH₂CONH₂ ‖ ‖ ⎢ RCNCH₂CH₂N—CH₂CH₂NCCH₂CH₂CH₂OH H‖ O | 11 |
| I | O H ⎡CH₂CH₂CONH₂ ‖ ‖ ⎢ RCNCH₂CH₂N—CH₂CH₂NCCH₂CH₂CH₂OCH₂CH₂CONH₂ ‖ O | 12 |
| J | ⎡ O ⎡CH₂CH₂CONH₂ ⎤⁺ ⎢ ‖H ⎢ ⎢ RCNCH₂CH₂—N—CH₂CH₂NHC(O)CH₂CH₂CH₂OCH₂CH₂CONH₂ ⎥ OH⁻ ⎣ ⎣CH₂CH₂CONH₂ ⎦ | |
| K | O ‖H RCNCH₂CH₂NCH₂CH₂NCH₂CH₂CONH₂ | 14 |
| L | O CH₂CH₂CONH₂ ‖H ╱ RCNCH₂CH₂NCH₂CH₂N ╲ CH₂CH₂CONH₂ | 15 |
| M | O CH₂CH₂CONH₂ ‖H ╱ RCNCH₂CH₂N CH₂CH₂CONH₂ ╲ ╱ CH₂CH₂N ╲ CH₂CH₂CONH₂ | 16 |
| N | ⎡ O ⎢CH₂CH₂CONH₂ CH₂CH₂CONH₂⎤⁺⁺ ⎢ ‖H ⎢ ╱ ⎢ RCNCH₂CH₂—N—CH₂CH₂——N—CH₂CH₂CONH₂ ⎥ 2OH⁻ ⎣ ⎢CH₂CH₂CONH₂ ╲CH₂CH₂CONH₂⎦ | 17 |
| O | O ‖H RCNCH₂CH₂OCH₂CH₂CONH₂ | 19 |

The foregoing compounds are prepared by reacting amido compound having the formula

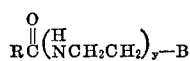

wherein y is 1—2; B is —NH₂ or —OH; and R has the definition specified hereinbefore; with (a) an acrylate ester, (b) an acrylamide, or (c) substituted acrylamide; when the aforedefined reactant is a primary amine, i.e. —B is —NH₂, it may also be reacted with a butyrolactone. These reactions take place by mixing the two reactants over a period of time at a temperature between about 60° C. and 130° C., preferably between about 90° C. and 110° C. For the reaction to proceed with one or two moles of acrylamide reactant, per mole of the fatty acid amido reactant, the preferred temperature is between about 90° C. and 100° C. To react three or four moles of the acrylamide, requires higher temperatures (100° C.–110° C.) and longer time. It is preferred to include the reaction mixture, from 10% to 20% based upon the weight of total reactants, of a hydrocarbon solvent such as toluene, zylene, cyclohexane or heptane.

The acrylate reactants useful in preparing the novel amido compounds are generally the acrylate esters, and acrylamide and substituted acrylamides. Methyl acrylate is the preferred acrylate. Esters having up to four carbon atoms in the esterifying group are also useful. In addition to the preferred acrylamide and methacrylamide, equivalent alkyl substituted acrylamides having up to four carbon atoms in the side chain are also useful.

The butyrolactones are 5-member ring compounds having the formula

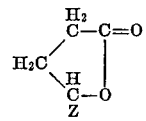

Z is hydrogen when the compounds is butyrolactone. Substituted rings include γ-valerolactone and the various 5-member sugar lactones. Other lactone ring systems are equivalents of the butyrolactones in the instant process. These include δ-valerolactone, and the 4-member ring systems, such as propiolactone and sulfone, which is prepared by conversion from butylsulfone. The term "butyrolactone" as used herein includes the substituted butyrolactones (γ-lactones) and equivalent lactone ring systems of different sizes.

The butyrolactones will only react with the primary nitrogen atom. Subsequent reaction with an acrylate or acrylamide will be at a secondary or tertiary nitrogen atom. The presence of an adjoining carbonyl group inactivates the adjoining nitrogen atom. When molar quantities of the acrylates and/or acrylamides in amounts greater than that necessary to form tertiary amines at the reactive nitrogen sites are used in the reaction, quarternary ammonium salts of the type illustrated by compounds F, J, and N, are formed.

Many of these novel amido compounds have reactive terminal groups. The fatty acid amido ethyl ethanol amine (product of Example 5) has a reactive terminal hydrogen on the hydroxy group which can be further reacted with such compounds as acrylamide, etc., to produce compounds such as those identified as E and F. Compounds I and J are further examples of such derivatives of the compounds defined hereinbefore. Acrylamide, methacrylamide, methyl acrylate, methyl methacrylate, and butyl acrylamide, are illustrative of compounds that react with the terminal hydroxy group. Monoethanolamine, diethanolamine, monoisopropanolamide, di-isopropanolamine, and tris hydroxy methyl amino methane, are illustrative of compounds that react with terminal ester groups; and propiolactone, butyrolactone, valerolactone, β-lactone, sulfone, γ-lactone, and δ-lactone, are illustrative of compounds that react with terminal amine groups.

The fatty acid amido reactants, having the formula

are prepared by reacting the fatty acid, or an ester thereof, with an amine. The preferred R groups are the residues of fatty acids and include capric, deconoic, lauric, myristic, palmitic, stearic, oleic, linoleic, erucic, and pelargonic, and mixtures of the fatty acids as found in natural occuring glycerides. The methyl esters of the fatty acids are preferably used in the preparation so as to minimize possible side reactions. However, in place of the methyl esters, other equivalent esters as well as the acid itself may be used. The methyl ester of the acid is heated with the desired amine at between 70° C. and 130° C. for three to four hours, preferably under partial vacuum of about 100 mm. mercury pressure. A 10% charge of the reactant amine in excess of the stoichiometric 1:1 mole ratio is preferred. Between about 0.5% and 0.2%, based on the weight of the charge, of sodium metholate is used as a catalyst. The reaction vessel is fitted with a condenser trap to prevent the loss of amine during the reaction. Means are provided to remove and recover the methyl alcohol resulting from the reaction. The amine reactants are ethylene diamine, diethylene triamine, aminoethyl ethanolamine, propylene diamine, monoethanol amine, and such equivalent hydroxy amines as diethanolamine, isopropylamine, di-isopropylamine, and tris hydroxymethylamino methane. The hydroxy groups may all, or only some of them, be further reacted with the acrylate compounds or a portion of them as desired, as exemplified by compound O.

Preparation of the amido compounds is illustrated in the following examples.

Example 1.—1 mole of the methyl ester of the fatty acid derivative of coconuts (216 average molecular weight) is heated with 1.1 mole of ethylenediamine at between 70 and 130° C. for about four hours under partial vacuum of 100 mm. Hg pressure. .3% based on the weight of the charge, of sodium metholate is added as catalyst. The reaction vessel is fitted with a condenser trap. At the completion of the reaction, lauryl (coco) acid amido ethyl amine is recovered.

Example 2.—One mole of the product of Example 1 is reacted with 1.1 mole of butyrolactone at a temperature between 90–95° C. for three to four hours. The butyrolactone is added slowly over a period of one hour, to form lauryl acid amido ethyl hydroxy butyramide (compound A.)

Example 3.—One mole of the product of Example 1 is reacted with 1.1 mole methyl methacrylamide at about 95° C. for three hours, to yield lauryl acid amido ethyl amino methyl propionamide (compound B).

Example 4.—One mole of the product of Example 1 is reacted with 2.2 moles of acrylamide at about 95° C. for about four hours, to yield lauryl acid amido ethyl amino bis propionamide (compound C.)

Example 5.—One mole of the methyl ester of tallow acid is reacted with 1.1 mole of aminoethyl ethanolamine at about 120° C. in the presence of sodium methoxide, following the procedure of Example 1, to yield tallow acid amido ethyl ethanol amine.

Example 6.—One mole of the product of Example 5 is reacted with 1.1 mole of acrylamide at about 95° C. for six hours to yield tallow acid amido ethyl, ethanol, propionamide-amine (compound D).

Example 7.—One mole of the product of Example 5 is reacted with 2.2 moles of acrylamide to yield the tallow acid amido ethyl, ethoxy propionamide, propionamide amine (compound E).

Example 8.—One mole of the product of Example 5 is reacted with 3.3 moles of acrylamide at about 110° C. for eight hours, in the presence of sodium methoxide and 10% of toluene, to yield tallow acid amido ethyl, dipropionamide, ethoxy propionamide ammonium hydroxide (compound F).

Example 9.—One mole of methyl ester of castor oil is reacted with 1.1 mole diethylene triamine in accordance with the procedure of Example 1, to yield castor oil amido aminoethyl ethylamine.

Example 10.—One mole of the product of Example 9 is reacted with 1.1 mole butyrolactone at 92° C., to yield castor oil amido ethyl aminoethyl hydroxy butyramide (compound G).

Example 11.—One mole of the product of Example 10 is reacted with 1.1 mole of acrylamide at 97° C., to yield castor oil amido ethyl, hydroxy butyramido ethyl, propionamide-amine (compound H).

Example 12.—One mole of the product of Example 10 is reacted with 2.2 moles of acrylamide at 110° C. in the presence of sodium methoxide to yield castor oil amido ethyl, amido propoxy butyramido ethyl, propionamide-amine (compound I).

Example 13.—One mole of the product of Example 10 is reacted with 3.3 moles of acrylamide at about 110° C., in the presence of sodium methoxide to yield castor oil amido ethyl, amido propoxy butyramido ethyl, dipropionamide-ammonium hydroxide (compound J).

Example 14.—One mole of the product of Example 9 is reacted with 1.1 mole of acrylamide, to yield castor oil amido ethyl amino ethyl, propionamide-amine (compound K).

Example 15.—One mole of the product of Example 14 is reacted with 1.1 mole of acrylamide, to yield castor oil amido ethyl amino ethyl, dipropionamide-amine (compound L).

Example 16.—One mole of the product of Example 15 is reacted with 1.1 mole of acrylamide to yield castor oil amido ethyl, propionamide-amine ethyl, dipropionamide amine (compound M).

Example 17.—One mole of the product of Example 16 is reacted with 2.2 moles of acrylamide in the presence of sodium methoxide at 110° C. for eight hours, to yield castor oil amido diethyl penta-propionamide diammonium dihydroxide (compound N).

Example 18.—One mole of methyl ester of palmitic acid is reacted with 1.1 mole of monoethanol amine in the presence of sodium methoxide, to yield palmitic acid amido ethanol.

Example 19.—One mole of the product of Example 18 is reacted with 1.1 mole of acrylamide in the presence of 10% toluene and sodium methoxide to yield palmitic acid amido ethoxy propionamide (compound O).

The novel amido derivatives defined herein are useful as components of compositions containing surface active agents used in shampoos, fabric cleaners, anti-acne creams and sunburn lotions. They function as foam boosters; emulsifiers; and solubilizing agents. They also impart non-irritating properties to the composition. They are particularly useful in combination with compositions containing (1) cationic surface active agents, (2) non-ionic surface active agents, and (3) substituted melamines. These novel amido compounds are usually used in amounts between about 0.4 percent and 7 percent, by weight, of the composition and preferably between about 1 percent and 5 percent.

It will be seen from the foregoing tabulations that a variety of cationic, nonionic and anionic detergent compositions, as well as soaps can be formulated using the compounds described to develop various antistatic, foaming, lubricity, mildness, etc. properties in the compositions:

The following base formulation based on biologically "soft" detergents have foaming, cleaning, fabric softening antistatic, brightening and bleaching properties.

| | 1 | 2 | 3 | 4 | 5 | 6 | 7 | 8 | 9 |
|---|---|---|---|---|---|---|---|---|---|
| Ethoxylated tallow F.A. (15 E.D.) | 8 | 8 | | 8 | | 8 | | | |
| Ethoxylated lauryl a/c (12 E.D.) | | | 8 | | | | | | |
| Lauryl diethanol amide | 2 | | | 2 | 2 | 2 | 2 | 2 | 2 |
| Ethoxylated diethanolamide (2 E.D.) | 2 | 2 | 2 | 2 | 2 | 2 | 2 | 2 | 2 |
| Ethoxylated diethanolamide (10 E.D.) | 4 | 4 | 4 | 4 | 4 | 4 | 4 | 4 | 4 |
| Distearyl dimethyl ammonium chloride | 1 | 1 | 1 | 1 | 1 | 1 | 1 | 1 | 1 |
| 1-stearyl 3,5-bis methyl ethane sulfonate melamine | | | | 3.0 | | | 3.0 | 3.0 | |
| Condensate of ethylene oxide with hydrophobic base formed by condensing propylene oxide with propylene glycol | | | | | 8 | | 8 | 8 | 8 |
| Alkyl dimethyl benzyl ammonium chloride | | | | 1 | | | 1 | 1 | 1 |
| Polyoxyethylene sorbitate tristearate | | | | 2 | | | 2 | 2 | 2 |
| Lauryl isoquinolonium bromide | | | | 2 | | | 2 | 2 | 2 |
| Product example: | | | | | | | | | |
| 2 | | | | 4 | | | | | |
| 4 | | | | | 2 | | | | |
| 6 | | | | | | 2 | | | |
| 7 | | | | | | | 2 | | |
| 11 | | | | | | | | 2 | |
| 19 | | | | | | | | | 2 |
| Water, glycol, alcohol preservative | 100 | 100 | 100 | 100 | 100 | 100 | 100 | 100 | 100 |
| Draize Rabbit Eye Test | (1) | (2) | (2) | (2) | (3) | (4) | (4) | (4) | (5) |
| Draize Skin Test | (2) | (3) | (3) | (3) | (3) | (3) | (6) | (3) | (6) |

1 Moderate irritation.
2 Mild irritation.
3 Non-irritation.
4 Minor irritation.
5 Extreme irritation.
6 Severe irritation.

Composition 1 does not foam as well as compositions 2, 3, 4, 5, 6, and is more irritating than the latter compositions. Products are useful as fine fabric detergents, conditioning shampoos, anti-dandruff shampoos, etc.

Compositions 7 and 8 are much milder, opthalmically and dermally, foam better and have better lubricity than composition 9.

In the same vein amphoterics, nonionic and cationic compositions can be formulated or anionic and nonionic compositions can be formulated to give milder, foamier, more lubrous, etc. products:

| | 10 | 11 | 12 | 13 |
|---|---|---|---|---|
| Sulfo palmitic acid, Mg salt | | | | 12 |
| Miranol C2M (lauryl imidazoline disodium di carboxylate) | 12 | | | |
| Octyl phenoxy sulfonate | | | 10 | |
| Nonyl phenoxy sulfate | | 5 | | |
| Alkyl aryl sulfonate | | 5 | | |
| Lauric monothanolamide | | | 2 | |
| Lauric diethanolamide | 3 | | 2 | 2 |
| Ethoxylated monoethanolamide | | 6 | 6 | 6 |
| Pluronic F-68 (polypropoxy-polyethoxy glycol block polymer sold by Wyandotte) | 3 | | 4 | |
| Distearyl dimethyl ammonium chloride | 1 | | | |
| Ethoxylated octyl phenol | 3 | | 4 | |
| Product of example 12 | | | 2 | |
| Product of example 11 | 3 | | | |
| Product of example 16 | | | | 3 |
| Product of example 7 | | | | 2 |
| Water, perfume, preservatives, glycols, etc. | 100 | 100 | 100 | 100 |

The basic formulations containing an imidazoline and a substituted melamine are useful in dry skin lotions, antichap lotions and sunburn relief lotions. The following are illustrative:

| | Percent by weight basis; 100% active | |
|---|---|---|
| | 14 | 15 |
| Prod. of example 12 | | 3 |
| Prod. of example 2 | 3 | |
| 1-stearyl-3,5-bis methyl ethyl sulfonate | 2 | 4 |
| Melamine | | |
| Lauryl isoquinolonium bromide | 0.5 | 0.5 |
| Alkyl dimethyl benzyl ammonium chloride | 0.25 | 0.25 |
| Ethoxylated sorbitan tristearate | 2.0 | 2.0 |
| Liquid branched chain C-20 alcohol (Eutanol G by Dehydag) | 2.5 | 2.5 |
| Mineral oil | 10 | |
| Lauriediethanol amide | | 2 |
| Water, perf. preserv. etc. adjust pH to 5.0–6.0 with citric acid | 100 | 100 |

Composition 15

Percent by wt. basis (100% active)

| | |
|---|---|
| Product of Example 3 | 3 |
| Ethoxylated tallow fatty acids | 10 |
| Diethanol amide lauric | 1 |
| Ethoxylated lauric diethanol amide | 2 |
| Distearyl dimethyl ammonium sulfate | 2 |
| Tripolyphosphate | 45 |
| Sodium sulfate | 20 |
| A persulfate bleach agent | 3 |
| Water, preservatives, sodium silicate, brighteners, antitarnish agents, carboxy methyl cellulose, etc. | to 100 |

When it is desired to formulate compositions of soap and detergent mixtures, surface active agents of anionic and nonionic types and combinations of these to avoid bathtub ring and to keep the foaming properties good, i.e., to disperse the line soap formed in hard water and to keep good foaming properties, the problem is met by employing the amide compounds of this invention in such formulations. Such compositions comprise an anionic synthetic detergent in amount from 5–20% by weight, soap in amount of 40–80% by weight; from 0.5% to 5.0% of a lower alkylamide of a fatty acid having 10–20 carbon atoms in the chain and wherein each alkyl group contains 2–3 or 4 carbon atoms; a nonionic polyoxyalkylene surfactant in an amount from 2–20%; and in amount from 1% to 5% of a melamine, guanamine, guanamide and/ or amido compounds as described herein.

The anionic synthetic detergent can be the methyl, ethyl, isopropyl ester of α sulfo stearic palmitic or lauric acid or mixtures thereof. Rather than the esters, the magnesium salt of these acids can be used; the salts of alkyl sulfates, the alkyl methyl laurides, the alkyl isettionic acid esters, alkoxy polyethoxy sulfate, sulfated lauryl monoglyceride, lauryl ether hydroxy propionic sulfonate. These are by way of illustration of typical anionic materials and the list need not be considered exhaustive or restrictive of the class.

As many embodiments of this invention may be made without departing from the spirit and scope thereof, it is to be understood that the invention includes all such modifications and variations as come within the scope of the appended claims.

What is claimed is:
1. Compounds having the formula

wherein R is selected from the group consisting of saturated and unsaturated hydrocarbon groups having from 8 to 20 carbon atoms as derived from saturated and unsaturated fatty acids.

2. Compounds having the formula

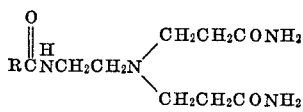

wherein R is selected from the group consisting of saturated and unsaturated hydrocarbon groups having from 8 to 20 carbon atoms as derived from saturated and unsaturated fatty acids.

3. Compounds having the formula

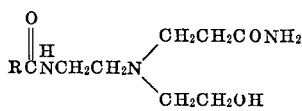

wherein R is selected from the group consisting of saturated and unsaturated hydrocarbon groups having from 8 to 20 carbon atoms as derived from saturated and unsaturated fatty acids.

4. Compounds having the formula

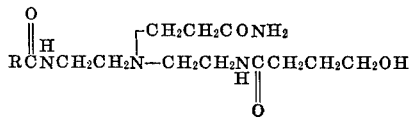

wherein R is selected from the group consisting of saturated and unsaturated hydrocarbon groups having from 8 to 20 carbon atoms as derived from saturated and unsaturated fatty acids.

5. Compounds having the formula

wherein R is selected from the group consisting of saturated and unsaturated hydrocarbon groups having from 8 to 20 carbon atoms as derived from saturated and unsaturated fatty acids.

6. Compounds having the formula

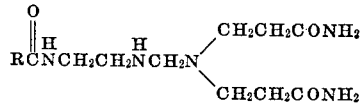

wherein R is selected from the group consisting of saturated and unsaturated hydrocarbon groups having from 8 to 20 carbon atoms as derived from saturated and unsaturated fatty acids.

7. Compounds having the formula

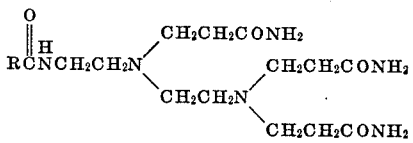

wherein R is selected from the group consisting of saturated and unsaturated hydrocarbon groups having from 8 to 20 carbon atoms as derived from saturated and unsaturated fatty acids.

References Cited

UNITED STATES PATENTS

| | | | |
|---|---|---|---|
| 2,387,201 | 10/1945 | Weiner | 260—404.5 |
| 2,898,301 | 8/1959 | Mayhew et al. | 260—404.5 X |
| 2,372,808 | 4/1945 | Bruson | 260—484 |
| 2,329,406 | 9/1943 | Mauersberger | 260—404 XR |
| 2,816,911 | 12/1957 | Aelony. | |

NICHOLAS S. RIZZO, *Primary Examiner.*

F. A. MIKA, *Assistant Examiner.*

U.S. Cl. X.R.

260—561, 249.7; 252—117, 307, 357; 424—59, 70, 320